United States Patent
Kulshreshtha

(10) Patent No.: US 10,031,948 B1
(45) Date of Patent: Jul. 24, 2018

(54) IDEMPOTENCE SERVICE

(71) Applicant: Amazon Technologies, Inc., Reno, NV (US)

(72) Inventor: Rohit Kulshreshtha, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 797 days.

(21) Appl. No.: 14/094,179

(22) Filed: Dec. 2, 2013

(51) Int. Cl.
*G06F 17/30* (2006.01)
*G06F 9/46* (2006.01)

(52) U.S. Cl.
CPC ........ *G06F 17/30522* (2013.01); *G06F 9/466* (2013.01); *G06F 17/30088* (2013.01)

(58) Field of Classification Search
CPC ................ G06F 17/30–17/30997; G06F 9/466
See application file for complete search history.

(56) References Cited

U.S. PATENT DOCUMENTS

| | | | | |
|---|---|---|---|---|
| 4,807,118 A * | 2/1989 | Lin | ......................... | H04L 29/06 709/237 |
| 7,933,962 B1 * | 4/2011 | Banerjee | ........... | G06F 17/30306 709/202 |
| 8,171,227 B1 * | 5/2012 | Goldschmidt | ...... | H04L 67/2852 711/121 |
| 8,868,514 B2 * | 10/2014 | Lomet | ............... | G06F 17/30575 707/607 |
| 2004/0083347 A1 * | 4/2004 | Parson | .............. | G06F 17/30949 711/165 |
| 2006/0271784 A1 * | 11/2006 | Bolosky | ............... | G06Q 10/107 713/170 |
| 2009/0216901 A1 * | 8/2009 | Schloming | .............. | G06F 9/546 709/237 |
| 2013/0159281 A1 * | 6/2013 | Yang | ................. | G06F 17/30312 707/715 |

* cited by examiner

*Primary Examiner* — James E Richardson
(74) *Attorney, Agent, or Firm* — Thomas | Horstemeyer, LLP

(57) ABSTRACT

Disclosed are various implementations of systems that facilitate idempotence of transactions that are generated by a client application executed by a client device. Systems and methods described herein also facilitate cleanup of transaction data that is outside an idempotence window provided by an idempotence service.

24 Claims, 7 Drawing Sheets

IDEMPOTENCE SERVICE

BACKGROUND

Idempotence of transactions or any operation can be desirable in situations where a possibility of receiving the same transaction more than once exists. Accordingly, an idempotent transaction or operation is one in which the net result or effect of applying the transaction or invoking the operation more than once is the same as applying the transaction or invoking the operation only once. Systems providing or facilitating idempotent operations often provide an idempotence window, which is a window of time extending into the past during which idempotence of one or more operations is guaranteed.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
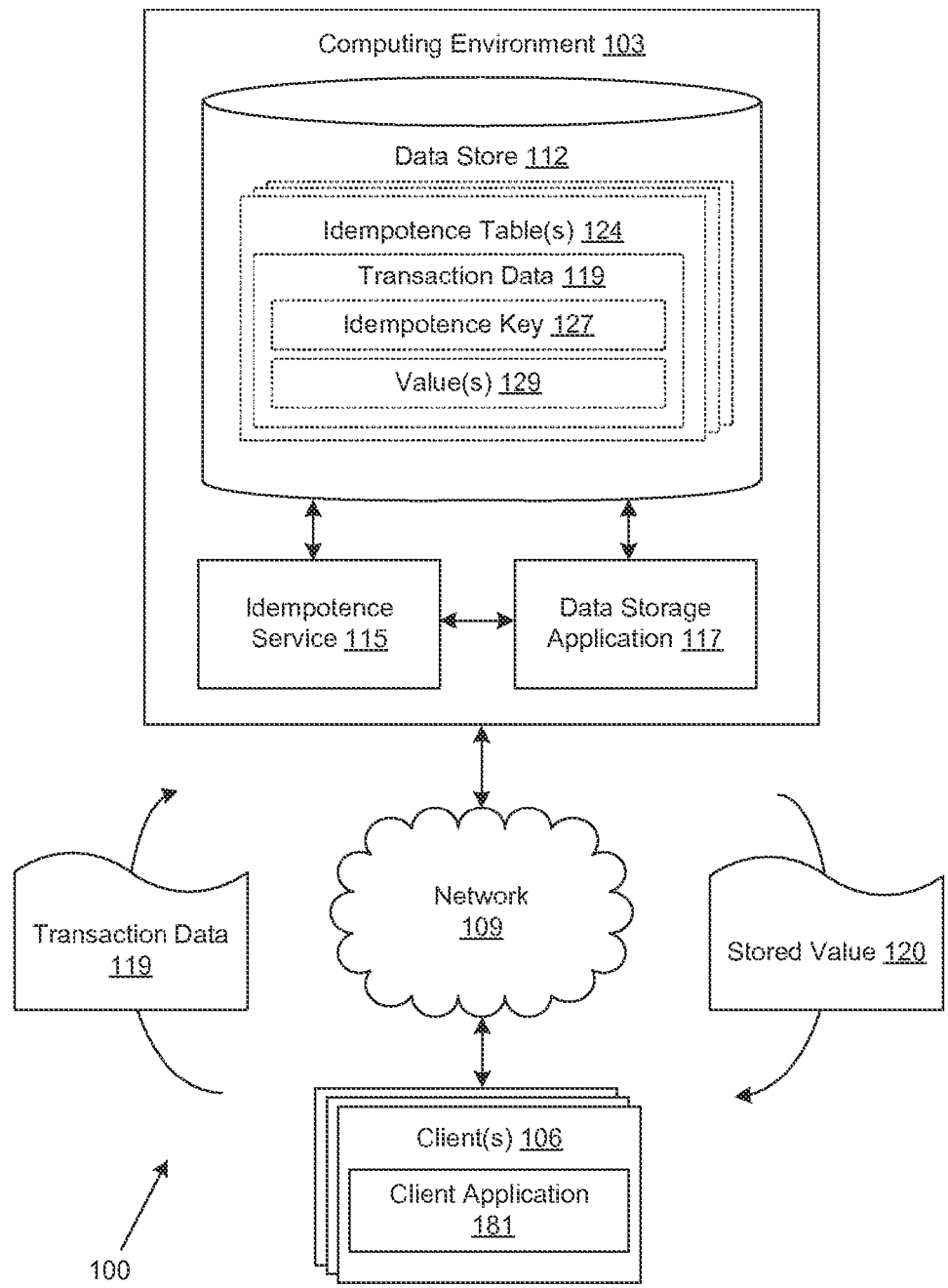
FIG. 1 is a drawing of a networked environment according to various implementations of the present disclosure.

The present disclosure relates to systems and methods that facilitate providing idempotent transactions or other types of operations. Idempotence of transactions or other operations can be desirable in situations where a possibility of receiving the same transaction more than once exists. Accordingly, an idempotent transaction or operation is one in which the net result or effect of applying the transaction or invoking the operation more than once is the same as applying the transaction or invoking the operation only once. Systems providing or facilitating idempotent operations often provide an idempotence window, which is a rolling window of time extending into the past during which idempotence of one or more operations is guaranteed.

As one example, a value stored in a data store for which idempotence is desired may be an account balance of a bank customer. One example of a transaction or operation that could be applied to an account balance value in a data store is one that increases or decreases the account balance. Accordingly, idempotence of such a transaction is desirable so that the account balance is not incorrectly increased or decreased. Such a scenario could arise, for example, if multiple computing devices are attempting to process the same transaction to increase the account balance in the data store. For example, if network connectivity prevents immediate transmission of such a transaction from a client device to a host machine charged with processing the transaction and updating the account balance in the data store, a client device may attempt to retransmit a duplicate transaction to the host machine or to another host machine in a cluster of machines that are charged with transaction processing. Should the original transmission of the transaction eventually succeed and should the retransmission attempt of the duplicate transaction succeed, a possibility exists that the initial transaction and the duplicate transaction are processed by one or more host machines charged with transaction processing. In this scenario, idempotence is desired so that the account balance is not incorrectly and doubly increased by the application of the transaction and the duplicate transaction.

To maintain idempotence of one or more values in a data store that re maintained by a service charged with transaction processing, client devices or client applications that are submitting transactions to modify the one or more values can submit such a transaction with a key, or an idempotence key, that can be uniquely associated with the transaction with respect to other transactions. The transactions can be archived or otherwise tracked to ensure that a single transaction does not get applied more than once or that application of a single transaction more than once does not corrupt the one or more values affected by the transactions.

Additionally, so that every transaction need not be archived indefinitely, a service charged with transaction processing, which is referred to herein as an idempotence service, can specify an idempotence window, or a window or time during which idempotence of a particular transaction is guaranteed. In other words, an idempotence service can guarantee that a particular transaction identified by a particular idempotence key, if submitted more than once during the idempotence window, will not corrupt the one or more values affected by the transaction. One reason for specifying an idempotence window is that providing an indefinite, infinite, or extremely large idempotence window may require the idempotence service to maintain information about transactions submitted by clients indefinitely, which could require data storage requirements that an operator of the service may be unwilling to provide. Additionally, as the size of a data store maintaining information about transactions grows, throughput of an idempotence service can be negatively impacted.

Therefore, idempotence services can provide a particular idempotence window that balance data storage requirements for maintaining information about transactions as well as service throughput considerations. Additionally, upon expiration of an idempotence window with respect to a given idempotence key, the idempotence key can then be made available for use for other subsequent transactions. Accordingly, an idempotence service can perform a cleanup process whereby transactions that are older or outside of the idempotence window can be purged, delete, or otherwise deactivated from the idempotence service so that the idempotence keys can be reused and so that the table or tables storing transaction data does not grow indefinitely or larger than is desired.

In some prior art idempotence services, performing such a purging or cleanup process can impact throughput or performance of the service, as finding an deleting transactions that are older than a particular idempotence window can impact system resources of a data store in which transaction data is stored. Additionally, in the case of certain database systems or data storage systems that are employed in some service deployments, such as a non-relational database system, tables storing transaction data may only provide for a single primary key with which a table can be searched. Accordingly, such a data store may not provide for the ability to search a table by a date or timestamp. In this scenario, performing a cleanup process may require the idempotence service to examine each record to determine whether it is older than a given timestamp or outside the idempotence window, which could negatively affect throughput or performance of the service to handle transaction processing tasks.

Therefore, embodiments of the present disclosure can provide a mechanism whereby an idempotence service can be implemented in such an environment in a way that provides the ability for the idempotence service to archive transaction data for a given idempotence window as well as perform cleanup of transaction data that is outside the idempotence window in a way that addresses performance or throughput concerns.

With reference to FIG. 1, shown is a networked environment 100 according to various implementations. The networked environment 100 includes a computing environment 103 as well as one or more client devices 106 in data communication via a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, the computing environment 103 may employ a plurality of computing devices that are arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various implementations. Also, various data is stored in a data store 112 that is accessible to the computing environment 103. The data store 112 may be representative of a plurality of data stores 112 as can be appreciated. The data stored in the data store 112, for example, is associated with the operation of the various applications and/or functional entities described below. In one embodiment, the data store 112 can comprise a relational or non-relational database system that includes multiple storage devices that can be geographically dispersed.

The components executed on the computing environment 103, for example, include an idempotence service 115, a data storage application 117 and other applications, services, processes, systems, engines, or functionality not discussed in detail herein. The idempotence service 115 is executed to process transactions based upon transaction data 119 received from client devices 106. For example, the idempotence service 115 can process bank transactions, electronic commerce transactions, transactions related to state information associated with execution of an application (e.g., state data for a game, productivity application, or other application) by a client device 106. Some embodiments describing certain systems and methods for maintaining idempotence of data that is synchronized across multiple devices are described in U.S. patent application Ser. No. 13/921,735, filed Jun. 19, 2013 and entitled Idempotence of Application State Data, which is hereby incorporated by reference herein in its entirety.

The idempotence service 115 can be executed or invoked as a portion of another application executed for some other reason in order to provide idempotent storage of data on behalf of the application. For example, a banking application tasked with management of financial data on behalf of customers can invoke the idempotence service 115 in order to store transaction data affecting customer accounts. The idempotence service 115 can store the transaction data as well as potentially perform other transaction processing while providing idempotence of the transactions submitted to or on behalf of the banking application.

For example, the idempotence service 115 can store information about individual transactions submitted to a banking application as well as maintain and tabulate data related to an account balance that is based upon the individual transactions. For example, in the case of an accumulating value such as an account balance, the idempotence service 115 can calculate a total of the accumulating value based upon an amount by which individual transactions associated with a particular account have updated the accumulating value as well as a value of the account balance that is stored in another table of the data store 112.

The idempotence service 115 provides idempotence for one or more values that are stored in the data store 112. Idempotence of a value stored in the data store 112 means that the integrity of a value stored in the data store 112 is guaranteed no matter how many times a given transaction is received and/or processed by the idempotence service 115 during a given idempotence window. An idempotence window represents a window of time during which the idempotence service 115 can guarantee that multiple transactions that are submitted with the same idempotence key will not corrupt a value maintained by the idempotence service 115. Such a time window can be user configurable.

In some embodiments, the idempotence service 115 can be executed by multiple host devices that are potentially geographically disparate for throughput and/or performance reasons. For example, an instance of the idempotence service 115 executed by one computing device of the computing environment 103 can service a request to process a transaction submitted by a client device 106 while another instance of the idempotence service 115 can be executed by another computing device, and both instances can process transactions received from client devices 106 and store data in the data store 112.

The data storage application 117 can be executed to provide an interface with the data store 112 so that the idempotence service 115 can store data in the data store 112. For example, the data storage application 117 can perform queries against the data store 112 to retrieve data requested by the idempotence service 115, store data on behalf of the idempotence service 115 in the data store 112, delete data from the data store 112, set database triggers that notify the idempotence service 115 upon the occurrence of an event within the data store 112, or perform other database or data store 112 functions as can be appreciated.

The data stored in the data store 112 includes, for example, at least one idempotence table 124. In one embodiment, an idempotence table 124 represents data that is related to a particular data set or application in which one or more values are maintained as idempotent. For example, an idempotence table 124 can store data related to a particular banking application and store transaction data received from a banking application executed by the computing environment 103 and/or client devices 106. The data store 112 can also maintain separate idempotence tables 124 for potentially multiple applications or data sets. For example, the data store 112 can also store transaction data received from the banking application that is related to separate types of transactions or from another application, such as an application that tracks game state data on behalf of a game application, in a separate idempotence table 124. An idempotence table 124 can also be associated with a timestamp that identifies when the idempotence table 124 was created.

Entries within an idempotence table 124 are associated with idempotence key 127 that uniquely identifies a particular entry within a given idempotence table 124. In other words, the idempotence key 127 is associated with a transaction received by the idempotence service 115 for storage in the data store 112. Such a transaction can comprise a request to update one or more values stored in the data store 112, such as an accumulating value, an account balance, a score, total, or any other value. An entry within the idempotence table 124 is also associated with at least one value 129. A value 129 represents information associated with a transaction generated by a client application 181. For example, the value 129 can represent an amount by which a value, such as an account balance, for which idempotence is desired should be modified. Each of the The client device 106 is representative of a plurality of client devices that may be coupled to the network 109. The client device 106 may comprise, for example, a processor-based system such as a computer system. Such a computer system may be embodied in the form of a handheld device having an integrated barcode scanner and display, a handheld device having an integrated image capture device and display, a desktop computer, a laptop computer, personal digital assistants, cellular telephones, smartphones, set-top boxes, music players, web pads, tablet computer systems, game consoles, electronic book readers, or other devices with like capability.

The client device 106 may be configured to execute various applications such as a client application 181 and/or other applications. The client application 181 may, for example, correspond to any application executed by the client device 106 that generates transaction data 119 that is transmitted to the idempotence service 115 for transaction processing and/or storage in the data store 112.

In one embodiment, the client application 181 can access an application programming interface (API) that provides calls allowing the client application 181 to transmit one or more values in association with an idempotence key 127 to the idempotence service 115. Accordingly, the client application 181 may be in data communication via inter-process communication, remote method invocation, remote procedure call, simple object access protocol (SOAP), representational state transfer (REST), and/or other communication APIs. Such an API can allow the client application 181 to employ the services of the idempotence service 115 for the purposes of processing transactions in an idempotent fashion without having to manage storage of information in the data store 112. In other words, the idempotence service 115 can provide a hosted solution for idempotent transaction processing on behalf of a client application 181.

Transaction data 119 corresponding to a transaction generated by the client application 181 and submitted to the idempotence service 115 can include an idempotence key 127 that uniquely identifies the transaction with respect to other transactions received by the idempotence service 115 during a specified idempotence window. The client application 181 can generate an idempotence key 127 that uniquely identifies the transaction data 119 with respect to other transactions. As one example, the client application 181 can employ an order number as an idempotence key 127 or any other identifier that can identify a transaction or operation. In other words, the idempotence key 127 can be an identifier that is meaningful to the client application 181.

Embodiments of the present disclosure provide idempotence of transactions as well as facilitate cleanup of transaction data stored in the data store 112 that are older than a specified idempotence window by employing a methodology whereby at least two idempotence tables 124 are employed.

To illustrate, upon initial deployment of an idempotence service 115, one or more values 129 can be stored along with an idempotence key 127 in a first idempotence table 124 and a second idempotence table 124. Upon expiration of an idempotence window, which is a period of time that can be user configurable as a duration of time for which idempotence of transactions is guaranteed by the idempotence service 115, the transaction data 119 stored in the first and second tables that was received by the idempotence service 115 within the idempotence window should mirror one another.

If transaction data 119 is received from a client device 106 during the window of time during which the first table and second table are being employed, the idempotence service 115 can extract the idempotence key 127 from the transaction data 119 and determine whether the idempotence key 127 already exists in the first table. If the extracted idempotence key 127 from the transaction data 119 does not exist in the first, the idempotence service 115 can store the transaction data 119 in the first idempotence table 124 in which the idempotence key 127 does not exist.

Then, the idempotence service 115 can copy the value 129 associated with the idempotence key 127 from the first table to the second table. If the idempotence key 127 exists in the first table but not the second table, the idempotence service 115 can again copy the value 129 associated with the idempotence key 127 in the first table to the second table. If the idempotence key 127 exists in both tables, the idempotence service 115 need not store the values 129 corresponding to the idempotence key 127 because the transaction data 119, in this scenario, has already been processed by the idempotence service 115.

The idempotence service 115 can also generate a response to transaction data 119 received from a client device 106 that includes at least one of a confirmation that the request was received, the value 129 extracted from the transaction data 119, or the value or values that the transaction is attempting to modify or affect via the transaction data 119. Such a response can be generated whether or not the transaction data 119 is already stored in the first idempotence table 124 and/or the second idempotence table 124. In the non-limiting example shown in FIG. 1, the idempotence service 115 can generate a response that includes a stored value 120 associated with the transaction. The stored value 120 can represent, for example, a value that the transaction associated with the transaction data 119 is attempting to update and/or modify, such as an account balance or other accumulating value.

Accordingly, continuing the above example, upon expiration of the idempotence window, the idempotence service 115 can begin storing received transaction data in the second idempotence table 124 as well as a third idempotence table 124 and cease storing transaction data 119 in the first idempotence table 124. At this time, the first idempotence table 124 can be deleted and/or cleaned up for reuse, as any transaction data 119 received during the preceding idempotence window is stored in the second idempotence table 124. A second idempotence window can be measured from the point at which the idempotence service 115 begins storing transaction data 119 in the second and third tables and when the idempotence service 115 ceases storing transaction data 119 in the first idempotence table 124.

Upon expiration of the second idempotence window, the idempotence service 115 can then begin storing transaction data 119 in the third idempotence table 124 and a fourth idempotence table 124 (or potentially in the first idempotence table 124 after its clean-up for use). Expiration of this second idempotence window can trigger another idempotence window, or a third idempotence window in this example. Upon expiration of the second idempotence, the second idempotence table 124 can be expired, deleted, and/or cleaned up for reuse as transaction data is stored in the third idempotence table 124 and the fourth idempotence table 124.

Accordingly, by employing the above methodology, moving forward beyond initial deployment, a given idempotence table 124 is in use for two idempotence windows before it is in effect phased out for a new idempotence table 124. Upon being phased out, an idempotence table 124 can simply be deleted, which provides a more efficient manner of purging the data store 112 of entries that are older than or outside a given idempotence window than periodically initiating a cleanup process whereby entries in an idempotence table 124 associated with ah timestamp that are outside an idempotence window are located and deleted from the idempotence table 124. By following the above methodology, the idempotence service 115 writes transaction data 119 including an idempotence key 127 and any additional values 129 to at least two idempotence tables 124 within the data store 112.

Figure 2A:
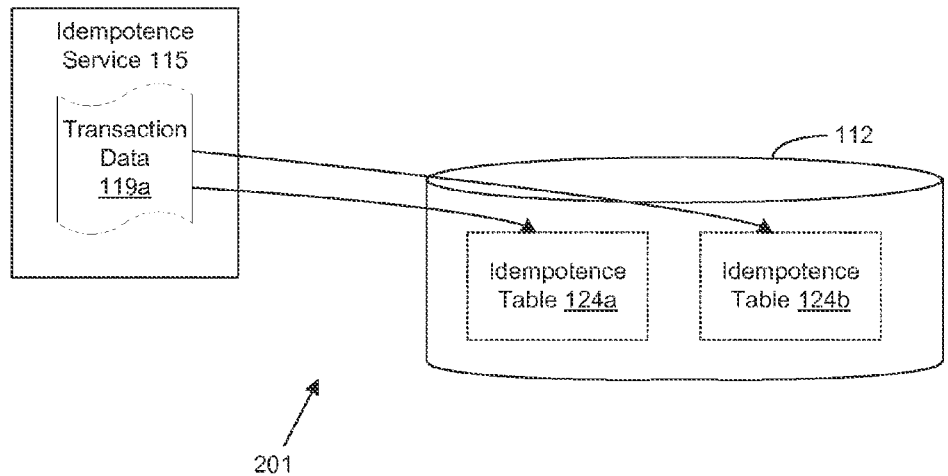
FIGS. 2A-2C are drawings that illustrate usage of idempotence tables according to various embodiments of the present disclosure.
Figure 2B:
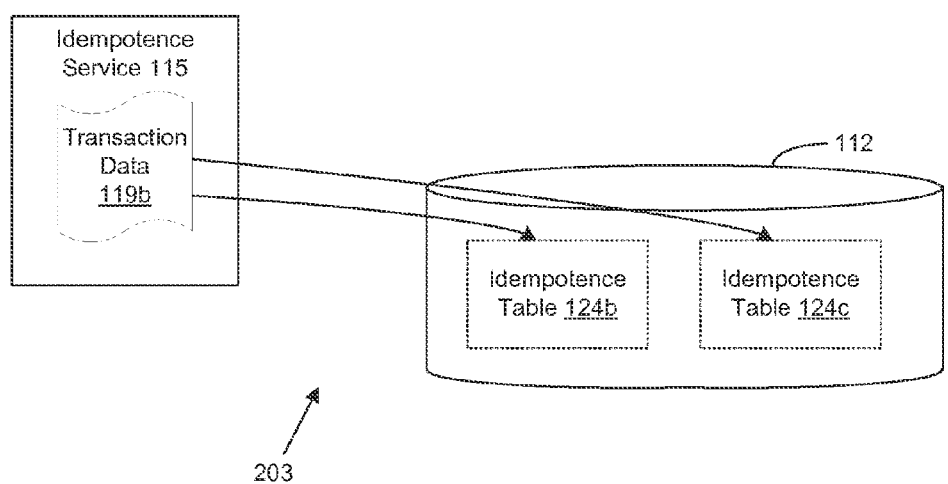
Figure 2C:
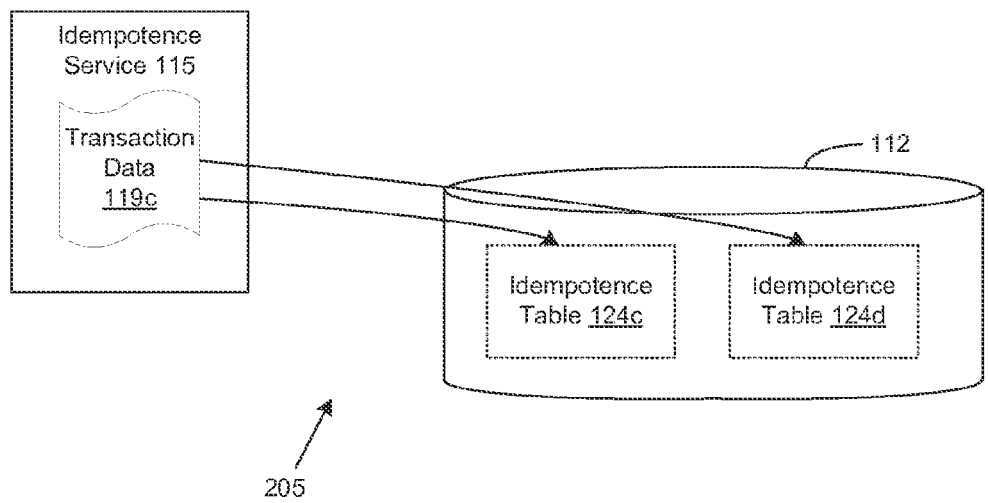

Referring next to FIGS. 2A-2C, shown are diagrams that illustrate how the idempotence service 115 can utilize idempotence tables 124 in a methodology that facilitates cleanup or deletion of transaction data 119 that falls outside of an idempotence window according to various embodiments of the disclosure. FIG. 2A illustrates a scenario 201 in which transaction data 119a received from a client application 181 is received by the idempotence service 115 and stored in a data store 112. The idempotence service 115 may interact with the data store 112 via a data storage application 117 or another service or API that allows the idempotence service 115 to store, delete or otherwise interact with the data store 112.

Accordingly, in the scenario 201 of FIG. 2A, transaction data 119a that includes an idempotence key 127 and one or more values 129 associated with the transaction is received from a client application 181 and stored in idempotence table 124a and idempotence table 124b in the data store 112. Additionally, in response to receiving the transaction data 119a from the client application 181, the idempotence service 115 can generate and transmit a response to the client device 106 from which the transaction data 119a originates in order to acknowledge receipt of the transaction data 119a from the client application 181.

Upon expiration of an idempotence window, for subsequent transaction data 119 received by the idempotence service 115, the idempotence service 115 can move to scenario 203 as illustrated in FIG. 2B. The idempotence window can represent a duration of time for which the idempotence service 115 can guarantee idempotence of transactions submitted by client application 181. As shown in FIG. 2B, transaction data 119b received by the idempotence service 115 is stored in idempotence table 124b and idempotence table 124c. At this time, upon expiration of the idempotence window, the idempotence table 124a (FIG. 2A) can be deleted or cleaned up for reuse by the idempotence service 115. The idempotence window can then trigger the running of another idempotence window from a time at which the idempotence service 115 begins to store transaction data 119 into the idempotence table 124c.

In this way, upon the expiration of the idempotence window, transaction data 119 corresponding to transactions received by the idempotence service 115 that are received during the newly triggered idempotence window are stored in both the idempotence table 124b and idempotence table 124c. Reference is now made to FIG. 2C, which depicts scenario 205. In scenario 205, the second idempotence window referenced in the discussion of FIG. 2B has expired. Accordingly, upon expiration of the second idempotence window, the idempotence service 115 can store transaction data 119 received from client devices 106 in idempotence table 124c and 124d. Accordingly, idempotence table 124b (FIG. 2A) can be deleted and/or cleaned up for reuse. It should be appreciated that idempotence table 124b, in this scenario, has been utilized for a window of time that is approximately twice the idempotence window. This "two table" methodology can continue to facilitate idempotence of transactions received by the idempotence service 115 as well as cleanup of transaction data 119 stored in the data store 112 that is older than or outside an idempotence window provided by or specified by the idempotence service 115.

In some embodiments, the idempotence service 115 can be configured to introduce a new idempotence table 124 upon expiration of a time window that is greater than an idempotence window associated with the idempotence service 115. In a multi-host environment in which multiple computing devices are executing the idempotence service 115, there may be differences in the clocks of the computing devices such that the various hosts executing the idempotence service 115 may not introduce a new idempotence table 124 at the same moment in time. Accordingly, employing a time window that is larger than the idempotence window can account for variations between clocks of various hosts that might be executing the idempotence service 115 and employing the data store 112 to store transaction data 119.

Figure 3:
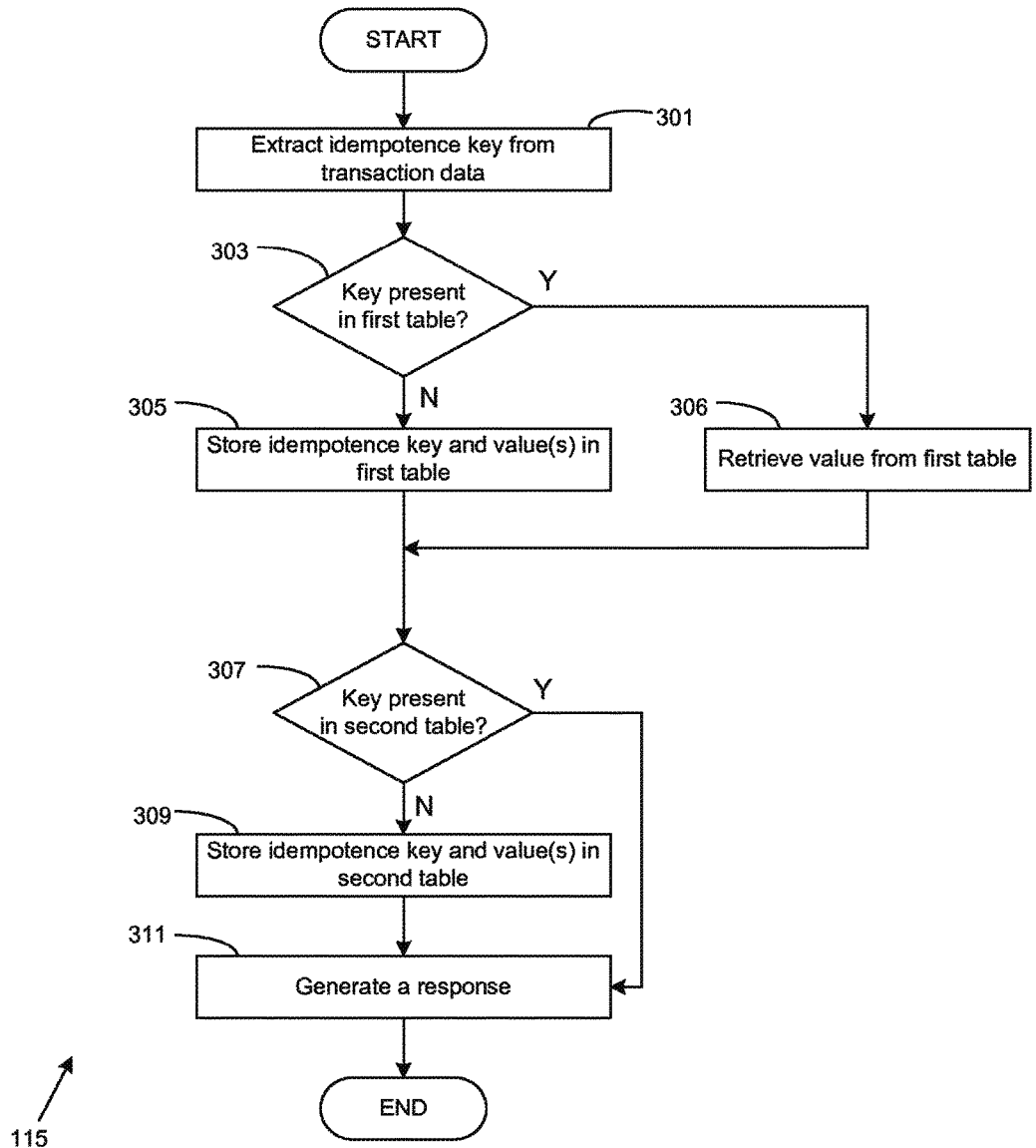
FIG. 3 is a flowchart illustrating one example of functionality implemented as portions of a method according to various implementations of the present disclosure.

Referring next to FIG. 3, shown is a flowchart that provides one example of the operation of a portion of the idempotence service 115 according to various embodiments. It is understood that the flowchart of FIG. 3 provides merely an example of the many different types of functional arrangements that may be employed to implement the operation of the portion of the idempotence service as described herein. As an alternative, the flowchart of FIG. 3 may be viewed as depicting an example of elements of a method implemented in the computing environment 103 (FIG. 1) according to one or more embodiments.

FIG. 3 illustrates one example of how the idempotence service 115 can store transaction data 119 obtained from a client application 181. As described above, transaction data 119 obtained from a client application 181 can include an idempotence key 127 and one or more value 129. In some embodiments, the transaction data 119 can also include a command, an operation, or any other data that can instruct the idempotence service 115 how to process the transaction corresponding to the transaction data 119. For example, the transaction data 119 can include a command instructing the idempotence service 115 or another service to add an amount to a particular customer balance associated with a particular customer account number. The transaction data 119 can also include other information, such as an authentication token or API token associated with the client device 106 and/or client application 181 so that the idempotence service 115 may authenticate the client application 181. The transaction data 119 can include any other data as can be appreciated to facilitate processing of a transaction.

Beginning with box 301, the idempotence service 115 extracts an idempotence key 127 from transaction data 119 received from a client device. The transaction data 119 corresponds to a request to update a value that is maintained by the idempotence service 115, such as a customer account balance or any other value or attribute. The transaction data 119 and/or idempotence key 127 can be generated by a client application 181. The idempotence key 127 uniquely identifies a transaction within an idempotence table 124 and/or during an idempotence window.

At box 303, the idempotence service 115 determines whether the extracted idempotence key 127 is already present in a first idempotence table 124 in the data store 112. If the idempotence key 127 is already present, then the idempotence service 115 can determine that the transaction data 119 corresponds to a duplicate transaction that has already been processed by the idempotence service 115 and avoid saving the received transaction data 119 in the first idempotence table 124. In other words, the idempotence service 115 can avoid processing the transaction data 119 because it can determine that the transaction data 119 corresponds to a duplicate. The idempotence service 115 can then retrieve the value 129 associated with the idempotence key 127 from the first idempotence table 124 in box 306.

If the idempotence key 127 is not present in the first idempotence table 124, then the idempotence service 115 can store the transaction data 119, including the idempotence key 127 and associated values 129, in the data store 112 at box 305. The process then proceeds to box 307, where the idempotence service 115 determine whether the idempotence key 127 is present in a second idempotence table 124. If the idempotence key 127 is not present in the second idempotence table 124, then at box 309, the idempotence service 115 stores the transaction data 119 in the second idempotence table 124. The idempotence service 115 stores the transaction data 119 associated with the idempotence key 127 retrieved from the first idempotence table 124 in the second idempotence table 124. In other words, if the idempotence key 127 is not present in the second idempotence table 124, the transaction data 119 associated with the idempotence key 127 is copied from the first idempotence table 124 to the second idempotence table 124. Otherwise, the transaction data 119 is stored in the second idempotence table 124. The process then proceeds to box 311, where the idempotence service 115 generates a response that is transmitted to the client application 181 acknowledging receipt of the transaction data 119.

In one embodiment, the process shown in FIG. 3 can also be understood with reference to the following non-limiting example pseudocode:

```
interface IdempotenceState {
    String getName( );
}
interface IdempotenceTable {
    IdempotenceState    storeOrRetrieve(IdempotenceState
        state);
}
class DuplexingIdempotenceStore {
    IdempotenceTable alphaTable;
    IdempotenceTable betaTable;
    IdempotenceState    storeOrRetrieve(IdempotenceState
        state) {
        State alphaState=alphaTable.storeOrRetrieve(state);
        State     betaState=betaTable.storeOrRetrieve(al-
            phaState);
        return betaState;
    }
}
```

As shown in the above-referenced pseudocode, the class DuplexingIdempotenceStore can employ at least two idempotence tables and represent functionality implemented by the idempotence service 115 according to various embodiments of the disclosure. Accordingly, state information that is passed into the class can represent transaction data 119 that is received by the idempotence service 115.

Figure 4:
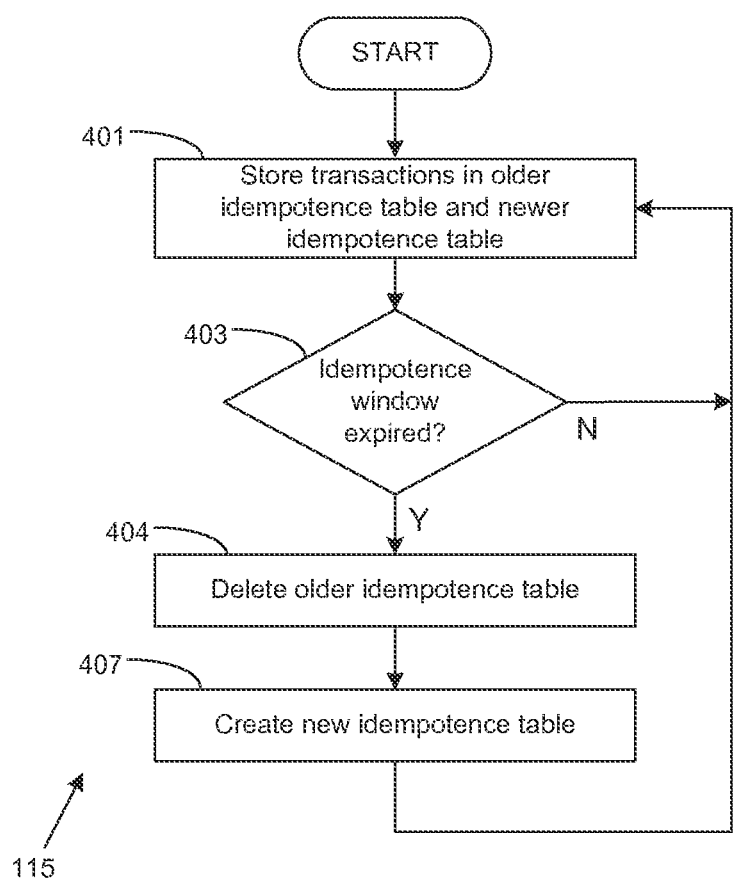
FIG. 4 is a flowchart illustrating one example of functionality implemented as portions of a method according to various implementations of the present disclosure.

Referring next to FIG. 4, shown is a flowchart that provides one example of the operation of a portion of the idempotence service 115 according to various embodiments. It is understood that the flowchart of FIG. 4 provides merely an example of the many different types of functional arrangements that may be employed to implement the operation of the portion of the idempotence service as described herein. As an alternative, the flowchart of FIG. 4 may be viewed as depicting an example of elements of a method implemented in the computing environment 103 (FIG. 1) according to one or more embodiments.

FIG. 4 illustrates an example of how the idempotence service 115 can cycle idempotence tables 124 to facilitate cleanup of transaction data 119 stored in the data store 112 that falls outside an idempotence window. In other words, FIG. 4 illustrates how the idempotence service 115 can select which idempotence tables 124 in the data store 112 are employed for storage of transaction data 119. The process depicted in FIG. 4 can be implemented as a background cleanup process, executed periodically, and/or executed each time a request to store transaction data is received. To begin, at box 401, the idempotence service 115 stores transactions in a first and second idempotence table, or in older and newer idempotence tables. Next, at box 403, the idempotence service 115 determines whether an idempotence window has expired.

If the idempotence window has not expired, the idempotence service 115 continues to store transaction data 119 in the first and second idempotence tables. Upon expiration of the idempotence window, the idempotence service 115 proceeds to box 404. At box 404, the idempotence service 115 can delete the older of the two idempotence tables 124 in which transaction data 119 is being stored. It should be appreciated that in some embodiments, instead of deleting the idempotence table 124, the idempotence service 115 can clean up the first idempotence table 124 for reuse or stop employing the first idempotence table 124 for storage of transaction data 119. At box 407, the idempotence service 115 can create or select a new or different idempotence table 124 in which transaction data 119 is stored.

Figure 5:
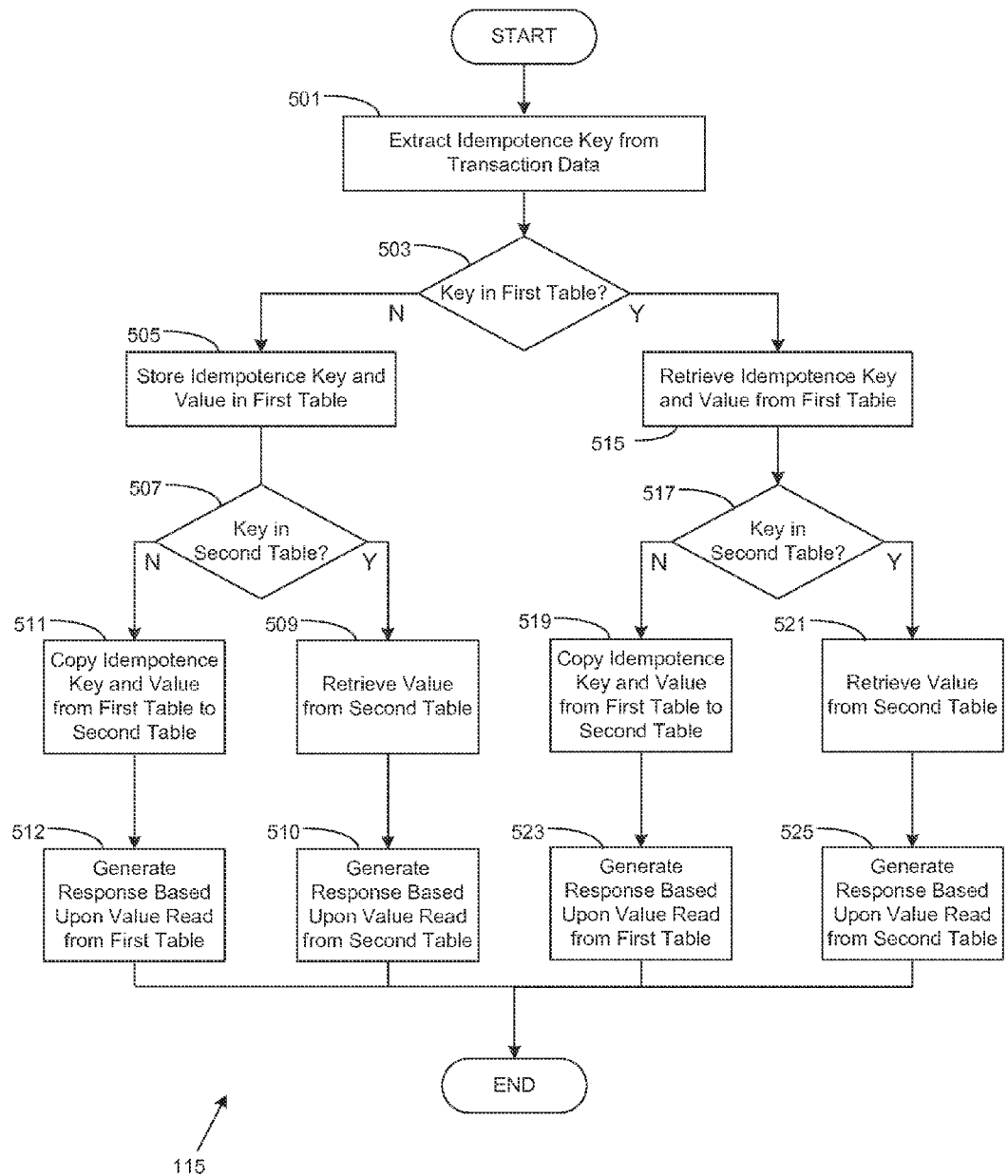
FIG. 5 is a flowchart illustrating one example of functionality implemented as portions of a method according to various implementations of the present disclosure.

Referring next to FIG. 5, shown is a flowchart that provides one example of the operation of a portion of the idempotence service 115 according to various embodiments. It is understood that the flowchart of FIG. 5 provides merely an example of the many different types of functional arrangements that may be employed to implement the operation of the portion of the idempotence service as described herein. As an alternative, the flowchart of FIG. 5 may be viewed as depicting an example of elements of a method implemented in the computing environment 103 (FIG. 1) according to one or more embodiments.

FIG. 5 illustrates an example of how the idempotence service 115 can store transaction data 119 obtained from a client application 181 according to various embodiments of the disclosure. More specifically, FIG. 5 illustrates one example of how the idempotence service 115 can process a transaction corresponding to the transaction data 119 by using at least two idempotence tables. First, at box 501, the idempotence service 115 can extract a key, or an idempotence key, and a value from the transaction data 119. At box 503, the idempotence service 115 can determine whether the key is stored in the first of two idempotence tables. If the key is not present in the first table, then the process proceeds to box 505, where the extracted key and value are stored in the first idempotence table.

The process then proceeds to box 507, where the idempotence service 115 determines whether the key is present in the second idempotence table. If so, then at box 509, the idempotence service 115 retrieves the value associated with the key from the second table and at box 510, generates a response based upon the value retrieved from the second table, which could include the value itself and/or a transaction identifier, or any other type of acknowledgement. If the key is not present in the second table, then at box 511 the key and value are copied from the first table to the second table and at box 512, a response is generated based upon the value copied from the first table and stored in the second table.

If, at box 503, the key is present in the first idempotence table, the process proceeds to box 515, where the idempotence service 115 retrieve the value associated with the idempotence key from the first idempotence table. Then, at box 517, the idempotence service 115 determines whether the key is present in the second idempotence table. If so, then at box 521, the idempotence service 115 retrieves the value associated with the key from the second table and at box 525, generates a response based upon the value retrieved from the second table, which could include the value itself and/or a transaction identifier, or any other type of acknowledgement. If the key is not present in the second table, then at box 519 the key and value are copied from the first table to the second table and at box 523, a response is generated based upon the value copied from the first table and stored in the second table. Thereafter, the proceeds to completion.

Figure 6:
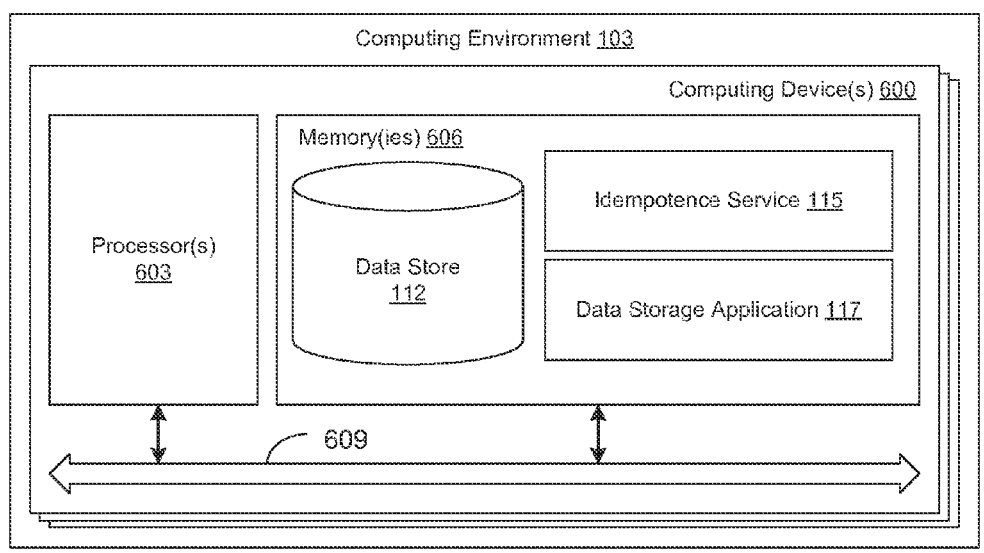
FIG. 6 is a schematic block diagram that provides one example illustration of a computing environment employed in the networked environment of FIG. 1 according to various implementations of the present disclosure.

With reference to FIG. 6, shown is a schematic block diagram of the computing environment 103 according to an implementation of the present disclosure. The computing environment 103 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the idempotence service 115, the data storage application 117 and potentially other applications. Also stored in the memory 606 may be a data store 112 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the idempotence service 115 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-5 show the functionality and operation of an implementation of portions of the idempotence service 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 3-5 show a specific order of execution, it is understood that the order of execution may differ from that which is depicted. For example, the order of execution of two or more blocks may be scrambled relative to the order shown. Also, two or more blocks shown in succession in FIGS. 3-4 may be executed concurrently or with partial concurrence. Further, in some implementations, one or more of the blocks shown in FIGS. 3-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the idempotence service 115 that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described implementations of the present disclosure are merely possible examples of implementations set forth for a clear understanding of the principles of the disclosure. Many variations and modifications may be made to the above-described implementation(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable by a computing device the program, when executed, causing the computing device to at least:
   identify a key and a value associated with a request received from a client device, the request comprising an update to a stored value stored in a data store accessible to the computing device, the request originating from an application programming interface (API) invoked by an instance of an application executed by the client device, the key uniquely identifying the request within at least one table within the data store;
   store the key and the value in a first table in the data store in response to a determination that a previously submitted request associated with the key is not stored in the first table;
   copy the key and the value from the first table to a second table in the data store in response to a determination that the previously submitted request is not stored in the second table;
   generate and transmit a response to the client device indicating receipt of the request;
   store, upon expiry of a time window relative to storage of a first entry in the first table, a subsequent key and a subsequent value associated with another request to update the stored value in the second table in the data store in response to a determination that another previously submitted request associated with the key is not stored in the first table in the data store;
   copy, upon expiry of the time window, the subsequent key and the subsequent value from the second table to a third table in the data store in response to a determination that the previously submitted request is not stored in the third table in the data store; and
   generate and transmit another response to the client device indicating receipt of the other request.

2. The non-transitory computer-readable medium of claim 1, wherein the response to the client device indicating receipt of the response comprises at least one of the key or the stored value.

3. The non-transitory computer-readable medium of claim 1, wherein the program further causes the computing device to delete the first table upon expiration of the time window.

4. The non-transitory computer-readable medium of claim 3, wherein the time window is relative to a timestamp associated with a creation of the first table.

5. The non-transitory computer-readable medium of claim 1, wherein the time window is at least as great as an idempotence window, the idempotence window associated with a period of time in which idempotence of the stored value is guaranteed with respect to a respective request to update the stored value, wherein the respective request is associated with the key.

6. The non-transitory computer-readable medium of claim 1, wherein the stored value corresponds to an accumulating value stored in the data store.

7. A system, comprising:
  at least one computing device;
  a data store in communication with the at least one computing device; and
  an idempotence service executable in the at least one computing device, the idempotence service causing the at least one computing device to at least:
    extract transaction data from a request to update a stored value stored in the data store received from one or more client devices, the transaction data including a key and a value;
    store the key and the value in a first table in the data store in response to a determination the key is not stored in the first table;
    copy the key and the value to a second table in the data store in response to a determination that the key is not stored in the second table;
    extract, upon expiry of a first time window relative to creation of the first table, second transaction data from a second request to update the stored value received from one or more of the one or more client devices, the second transaction data including a second key and a second value; and
    store the second key and the second value in the second table in the data store in response to a determination that the second key is not stored in the second table.

8. The system of claim 7, wherein the idempotence service further causes the at least one computing device to at least copy the second key and the second value from the second table to a third table in the data store in response to a determination that the second key is not stored in the third table.

9. The system of claim 7, wherein the idempotence service is configured to provide idempotence of the stored value with respect to the key during an idempotence window.

10. The system of claim 9, wherein the first time window is twice a duration of the idempotence window.

11. The system of claim 7, wherein the idempotence service further causes the at least one computing device to at least:
  extract, upon expiry of the first time window relative to creation of the second table, extracts third transaction data from a third request to update the stored value received from one or more of the one or more client devices, the third transaction data including a third key and a third value; and
  copy the third key and the third value to a third table in the data store in response to a determination the third key is not stored in the third table.

12. The system of claim 11, wherein the idempotence service further causes the at least one computing device to at least delete, upon expiry of the first time window relative to creation of the first table, the first table from the data store.

13. The system of claim 12, wherein the first time window is at least as great as an idempotence window associated with the idempotence service.

14. The system of claim 7, wherein the idempotence service further causes the at least one computing device to at least generate a response corresponding to the request, the response comprising at least one of the stored value, a confirmation that the request was received or the key.

15. The system of claim 7, wherein the stored value corresponds to an accumulating value and the value comprises an amount by which the accumulating value should be changed.

16. The system of claim 7, wherein the idempotence service further causes the at least one computing device to at least calculate an updated stored value in response to receiving the request.

17. A method comprising:
  extracting, by at least one computing device, transaction data from a request to update a stored value stored in the data store received from one or more client devices, the transaction data including a key and a value;
  store, by the at least one computing device, the key and the value in a first table in the data store in response to a determination the key is not stored in the first table;
  copy, by the at least one computing device, the key and the value to a second table in the data store in response to a determination that the key is not stored in the second table;
  extracting, by the at least one computing device, upon expiry of a first time window relative to creation of the first table, second transaction data from a second request to update the stored value received from one or more of the one or more client devices, the second transaction data including a second key and a second value; and
  storing, by the at least one computing device, the second key and the second value in the second table in the data store in response to a determination that the second key is not stored in the second table.

18. The method of claim 17, further comprising copying the second key and the second value from the second table to a third table in the data store in response to a determination that the second key is not stored in the third table.

19. The method of claim 17, further comprising:
  extracting, by the at least one computing device, upon expiry of the first time window relative to creation of the second table, extracts third transaction data from a third request to update the stored value received from one or more of the one or more client devices, the third transaction data including a third key and a third value; and
  copying, by the at least one computing device, the third key and the third value to a third table in the data store in response to a determination the third key is not stored in the third table.

20. The method of claim 19, further comprising deleting, by the at least one computing device, upon expiry of the first time window relative to creation of the first table, the first table from the data store.

21. The method of claim 20, wherein the first time window is at least as great as an idempotence window associated with the idempotence service.

22. The method of claim 17, further comprising generating, by the at least one computing device, a response corresponding to the request, the response comprising at least one of the stored value, a confirmation that the request was received or the key.

23. The method of claim 17, wherein the stored value corresponds to an accumulating value and the value comprises an amount by which the accumulating value should be changed.

24. The method of claim 17, further comprising calculating, by the at least one computing device, an updated stored value in response to receiving the request.

* * * * *